(12) United States Patent
Tseng

(10) Patent No.: US 11,163,220 B2
(45) Date of Patent: Nov. 2, 2021

(54) CAMERA DEVICE WITH A CLAMPING MODULE

(71) Applicant: Cheng Uei Precision Industry Co., LTD., New Taipei (TW)

(72) Inventor: Chi-Ming Tseng, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/063,714

(22) Filed: Oct. 5, 2020

(65) Prior Publication Data

US 2021/0165303 A1 Jun. 3, 2021

(30) Foreign Application Priority Data

Nov. 29, 2019 (CN) .......................... 201922114732.4

(51) Int. Cl.
*G03B 17/56* (2021.01)
*G03B 17/02* (2021.01)
*F16M 13/02* (2006.01)

(52) U.S. Cl.
CPC ......... *G03B 17/561* (2013.01); *F16M 13/022* (2013.01); *G03B 17/02* (2013.01)

(58) Field of Classification Search
CPC ...... G03B 17/02; G03B 17/561; F16M 13/02; F16M 13/022; F16M 2200/00; F16M 2200/02; F16M 2200/06
USPC ......... 396/143, 419, 428; 348/143; D16/242
See application file for complete search history.

(56) References Cited

U.S. PATENT DOCUMENTS

| D921,095 S | * | 6/2021 | Alberstein | .................. D16/242 |
| 2008/0022337 A1 | * | 1/2008 | Yang | ..................... F16M 13/022 |
| | | | | 725/105 |
| 2009/0008521 A1 | * | 1/2009 | Lee | ...................... F16M 13/022 |
| | | | | 248/226.11 |
| 2011/0192951 A1 | * | 8/2011 | Gooch | ................. G03B 17/566 |
| | | | | 248/316.7 |
| 2018/0087714 A1 | * | 3/2018 | Goffman | ................ F16M 11/10 |
| 2020/0224685 A1 | * | 7/2020 | Calhoun | .............. G03B 17/566 |
| 2021/0165304 A1 | * | 6/2021 | Tseng | .................. G03B 17/561 |

FOREIGN PATENT DOCUMENTS

TW M383671 U1 7/2010

* cited by examiner

*Primary Examiner* — Christopher E Mahoney
(74) *Attorney, Agent, or Firm* — Cheng-Ju Chiang

(57) ABSTRACT

A camera device with a clamping module includes a clamping module and a camera module. The clamping module includes a first clamping arm, a second clamping arm, an elastic element and a connection shaft. The first clamping arm has a first extending portion. The second clamping arm is positioned opposite to the first clamping arm. The second clamping arm has a second extending portion. The elastic element is mounted between the first extending portion and the second extending portion. The connection shaft is connected with the first extending portion, the elastic element and the second extending portion. The connection shaft passes through the elastic element, and the elastic element is mounted around the connection shaft. The camera module includes a rotation shaft. The camera module is pivoted to the outer surface of the first clamping arm by the rotation shaft.

19 Claims, 8 Drawing Sheets

CAMERA DEVICE WITH A CLAMPING MODULE

CROSS-REFERENCE TO RELATED APPLICATION

The present application is based on, and claims priority from, China Patent Application No. 201922114732.4, filed Nov. 29, 2019, the disclosure of which is hereby incorporated by reference herein in its entirety.

BACKGROUND OF THE INVENTION

1. Field of the Invention

The present invention generally relates to a camera device, and more particularly to a camera device with a clamping module which is capable of being positioned more stably, and visual angles of the camera device with the clamping module are adjustable.

2. The Related Art

In general, a conventional camera device has a basic video shoot and transmission function, a static image capturing function, etc. The conventional camera device converts images into digital signals which can be recognized by a computer by virtue of processing the images. The conventional camera device is mostly fastened to a top of a screen of a notebook computer, and after the images are inputted into the notebook computer by a parallel port and a USB connection element, the images are proceeded with an image restoration.

A Taiwan utility model patent, Taiwanese Patent No. M383671U1, issued on Jul. 1, 2010, discloses a composition structure improvement of a network camera. The composition structure improvement of the network camera includes a lens unit having a camera function, and a clamping unit used for a clamping and locating function. The lens unit utilizes a connection shaft of a lower end of the lens unit to be connected with a pivoting group. A characteristic of the lens unit is that the clamping unit includes a base board, a first clamping board, a second clamping board and a plurality of elastic elements. Two portions of one side of the base board protrude outward to form two pivoting ears opposite to each other. The other side of the base board forms a hollow shaft hole. The first clamping board and the second clamping board are corresponding to side edges of the base board. Each of the first clamping board and the second clamping board has two pivoting portions opposite to each other. After the two pivoting ears of the base board are interacted with the connection shaft of the lens unit, the base board is fastened between the two pivoting portions of the first clamping board by virtue of a rod passing through the two pivoting portions of the first clamping board. The second clamping board utilizes another rod to penetrate through the two pivoting portions of the second clamping board to be pivotally fastened to the shaft hole of the base board and pass through the plurality of the elastic elements to make elastic feet of two ends of each elastic element located between the base board and the second clamping board, so that the second clamping board has an elastic and tensile clamping force, in this way, the composition structure improvement of the network camera is facilitated for being clamped and located to a liquid screen or a location position.

However, a screen frame of the composition structure improvement of the network camera is designed towards a narrower and narrower edge, a foot stool structure of the composition structure improvement of the network camera will partially shield a screen area, and the foot stool structure is unstable that it is easy to fall off after the clamping the narrower edge of the of the screen frame, and the composition structure improvement of the network camera can just be fastened to one visual angle.

Therefore, it is essential to provide an innovative camera device with a clamping module which is capable of being positioned more stably, and visual angles of the camera device with the clamping module are adjustable.

SUMMARY OF THE INVENTION

An object of the present invention is to provide a camera device with a clamping module. The camera device with the clamping module includes a clamping module and a camera module. The clamping module includes a first clamping arm, a second clamping arm, an elastic element and a connection shaft. The first clamping arm has a first extending portion extended from an upper end of an inner surface of the first clamping arm, a first pressing portion recessed inward in an upper end of an outer surface of the first clamping arm, and a first clamping portion formed at a lower end of the inner surface of the first clamping arm. The second clamping arm is positioned opposite to the first clamping arm. The second clamping arm has a second extending portion extended from an upper end of an inner surface of the second clamping arm, a second pressing portion recessed inward in an upper end of an outer surface of the second clamping arm, and a second clamping portion slantwise extended outward and downward from a lower end of the inner surface of the second clamping arm. The elastic element is mounted between the first extending portion and the second extending portion. The connection shaft is connected with the first extending portion, the elastic element and the second extending portion. The connection shaft passes through a middle of the elastic element, and the elastic element is mounted around the connection shaft for making the first clamping arm and the second clamping arm have an elastic gripping force. The camera module includes a rotation shaft. The camera module is pivoted to the outer surface of the first clamping arm of the clamping module by the rotation shaft.

Another object of the present invention is to provide a camera device with a clamping module. The camera device with the clamping module includes a clamping module and a camera module. The clamping module includes a first clamping arm, a second clamping arm, an elastic element and a connection shaft. The first clamping arm has a first pressing portion recessed inward in an upper end of an outer surface of the first clamping arm, and a first clamping portion formed at a lower end of an inner surface of the first clamping arm. Two portions of two opposite sides of an upper end of the inner surface of the first clamping arm extend perpendicular to the upper end of the inner surface of the first clamping arm to form two first extending portions. The second clamping arm is positioned opposite to the first clamping arm. The second clamping arm has a second pressing portion recessed inward in an upper end of an outer surface of the second clamping arm, and a second clamping portion slantwise extended outward and downward from a lower end of an inner surface of the second clamping arm. Two opposite sides of an upper end of the inner surface of the second clamping arm extend towards the first clamping arm to form two second extending portions. The elastic element is located between the two second extending portions. The two second extending portions together with the elastic element are mounted between the two first extending portions. The connection shaft is connected with the two first extending portions, the elastic element and the two second extending portions. The connection shaft passes through a middle of the elastic element, and the elastic element is mounted around the connection shaft for making the first clamping arm and the second clamping arm have an elastic gripping force. The camera module includes a rotation shaft. The camera module is pivoted to the outer surface of the first clamping arm of the clamping module by virtue of the rotation shaft being pivoted to a lower end of the first clamping arm and a lower end of the camera module.

Another object of the present invention is to provide a camera device with a clamping module. The camera device with the clamping module includes a clamping module and a camera module. The clamping module includes a first clamping arm, a second clamping arm, an elastic element and a connection shaft. The first clamping arm has a first extending portion extended from an upper end of an inner surface of the first clamping arm, a first clamping portion formed at a lower end of the inner surface of the first clamping arm, a first pressing portion formed at an upper end of an outer surface of the first clamping arm, and a concave portion formed at a middle of the outer surface of the first clamping arm. The second clamping arm is positioned opposite to the first clamping arm. The second clamping arm has a second extending portion extended from an upper end of an inner surface of the second clamping arm, a second clamping portion formed at a lower end of the inner surface of the second clamping arm, and a second pressing portion formed at an upper end of an outer surface of the second clamping arm. The elastic element is located between the first extending portion and the second extending portion. The connection shaft is connected with the first extending portion, the elastic element and the second extending portion. The camera module has a rotation shaft which is pivoted to the first clamping arm. A rear portion of the camera module is received in the concave portion of the first clamping arm.

As described above, the camera device with the clamping module makes the first clamping arm and the second clamping arm have the gripping force by virtue of an elastic force provided by the elastic element, so that the camera device with the clamping module is able to stably grip the electronic equipment. Furthermore, a friction ring cooperates with the rotation shaft to make the camera module rotate visual angles to adjust the visual angles. Thus, the camera device with the clamping module is capable of being positioned more stably, and the visual angles of the camera device with the clamping module are adjustable.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
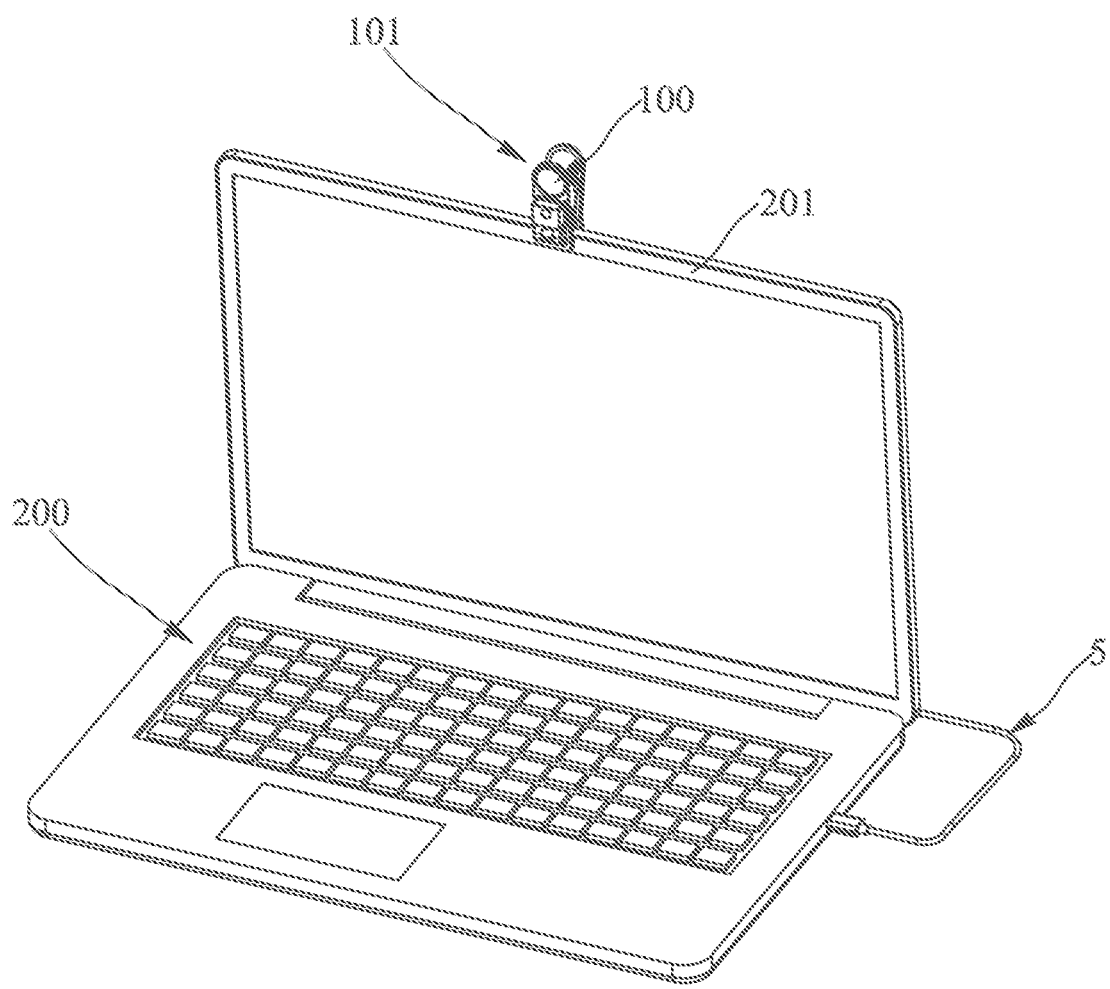
FIG. 1 is a diagrammatic drawing of a camera device with a clamping module in accordance with a preferred embodiment of the present invention, wherein the camera device with the clamping module is mounted to a computer.
Figure 2:
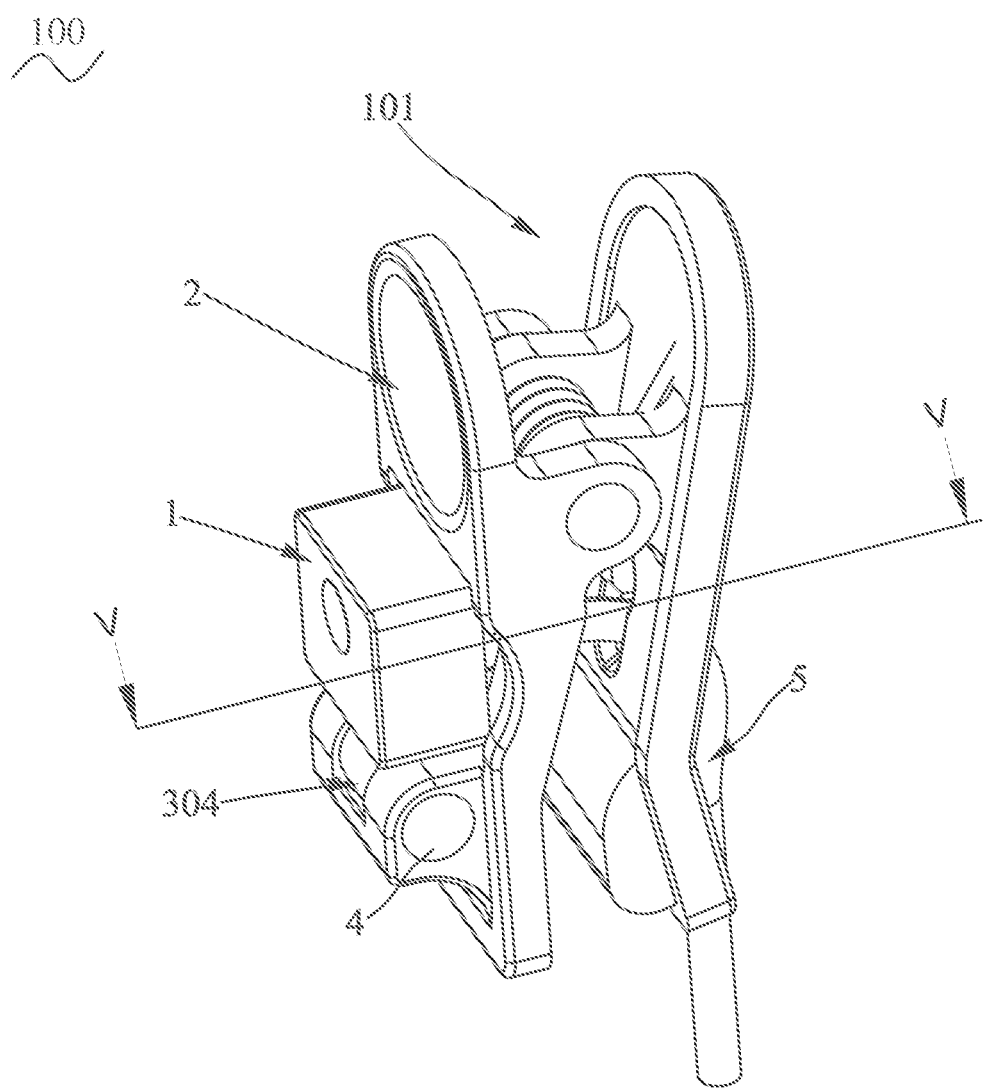
FIG. 2 is a perspective view of the camera device with the clamping module in accordance with the preferred embodiment of the present invention.
Figure 3:
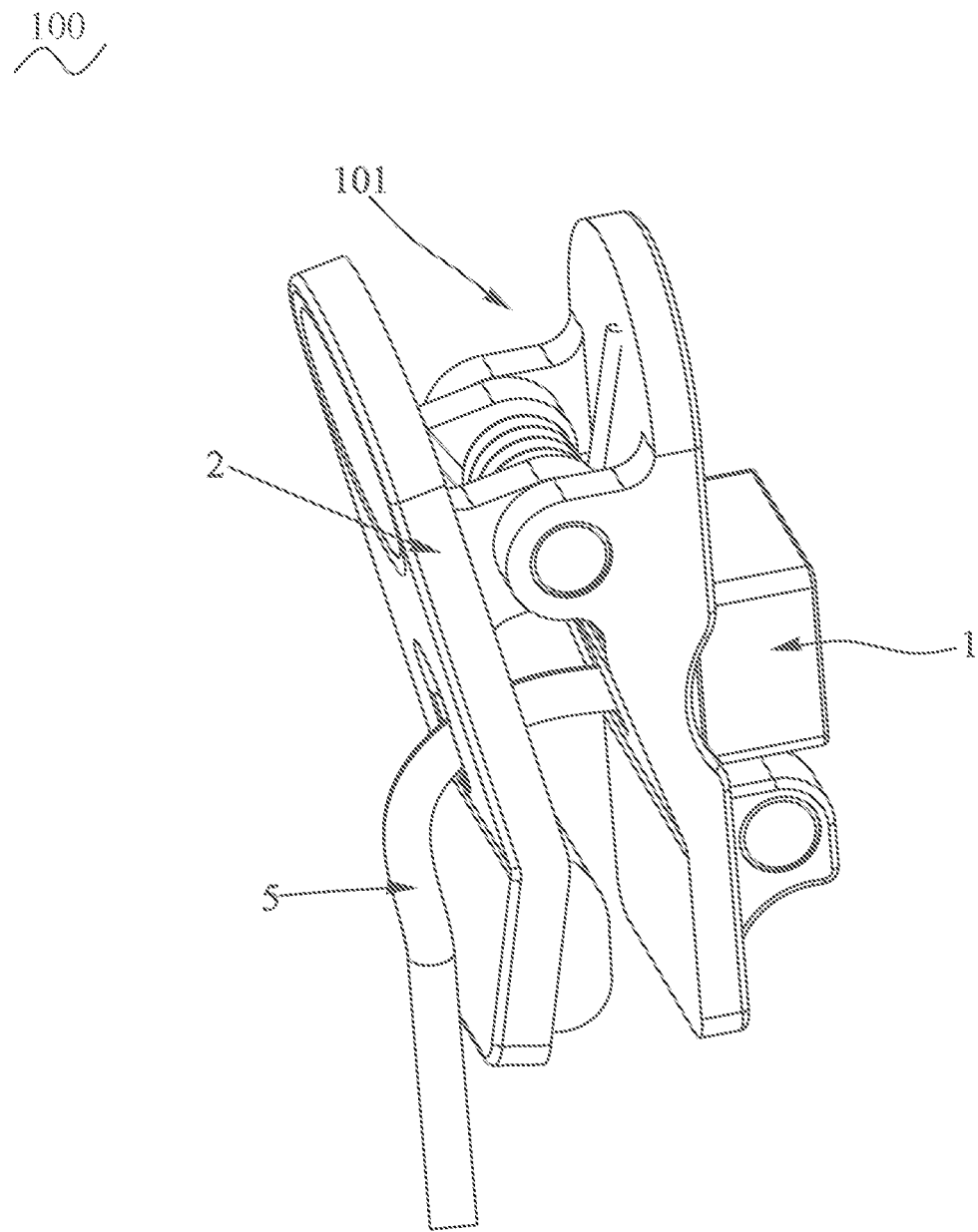
FIG. 3 is another perspective view of the camera device with the clamping module of FIG. 2.
Figure 4:
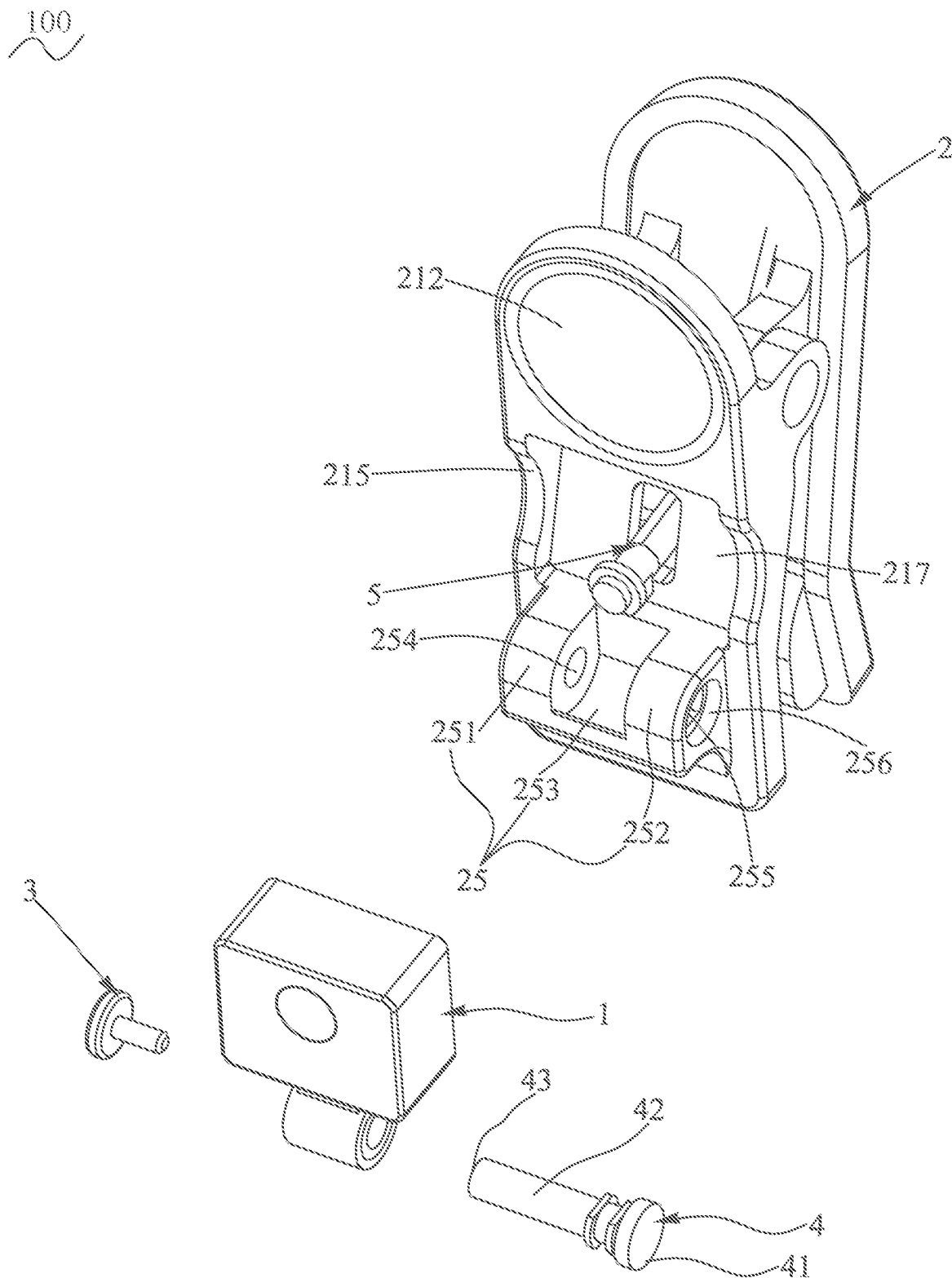
FIG. 4 is an exploded view of the camera device with the clamping module of FIG. 2.
Figure 5:
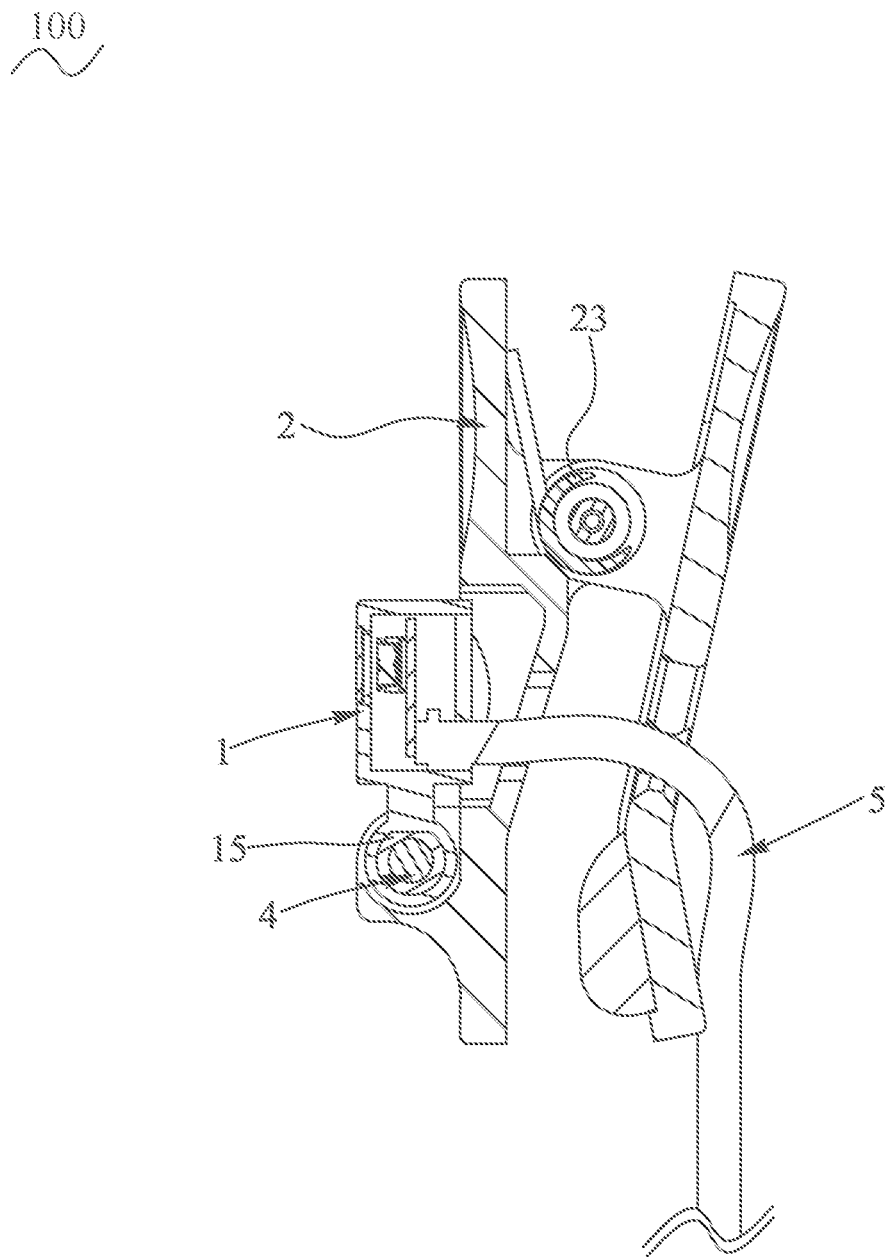
FIG. 5 is a sectional view of the camera device with the clamping module along a line V-V of FIG. 2.
Figure 6:
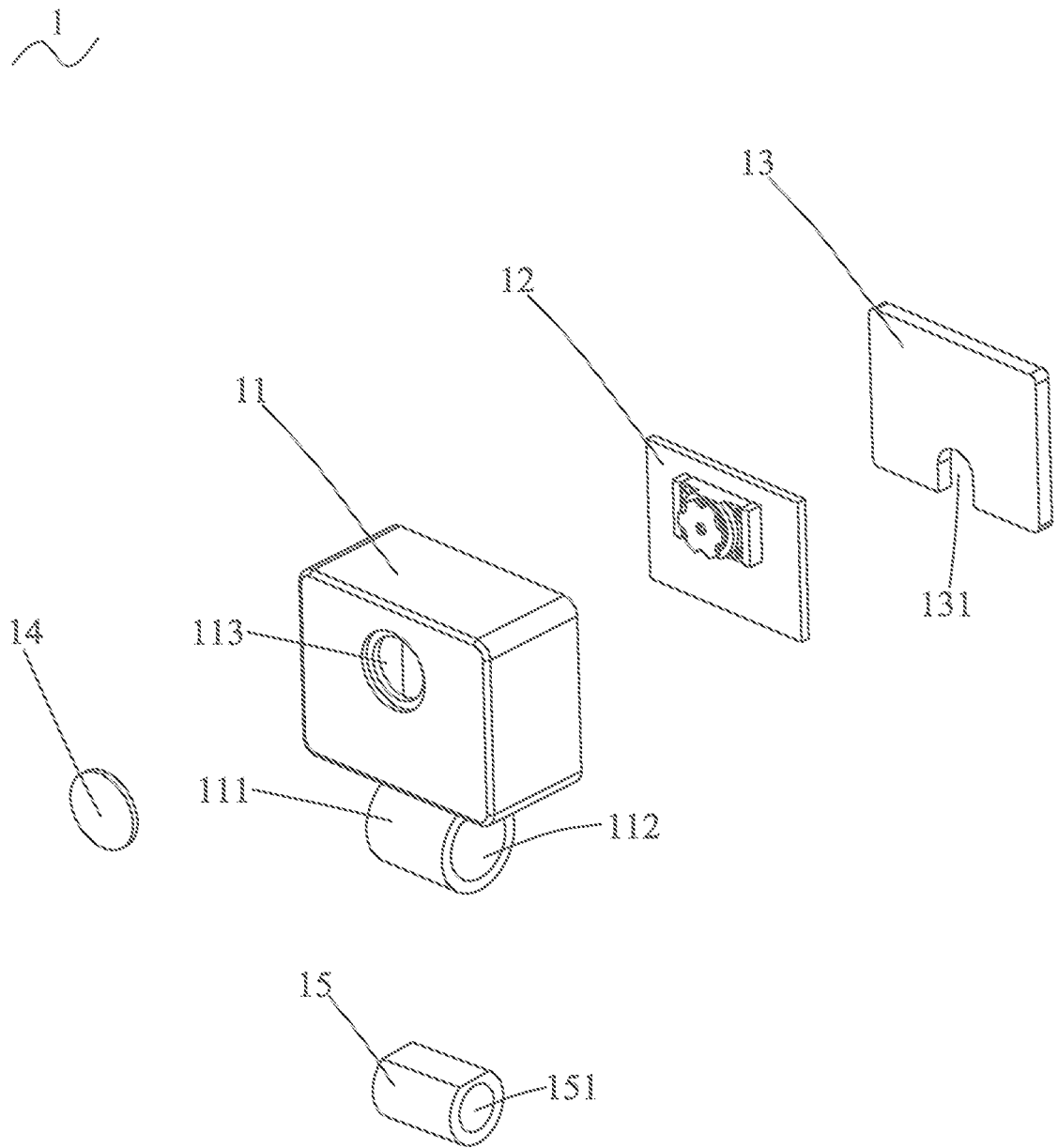
FIG. 6 is an exploded view of a lens module of the camera device with the clamping module in accordance with the present invention.
Figure 7:
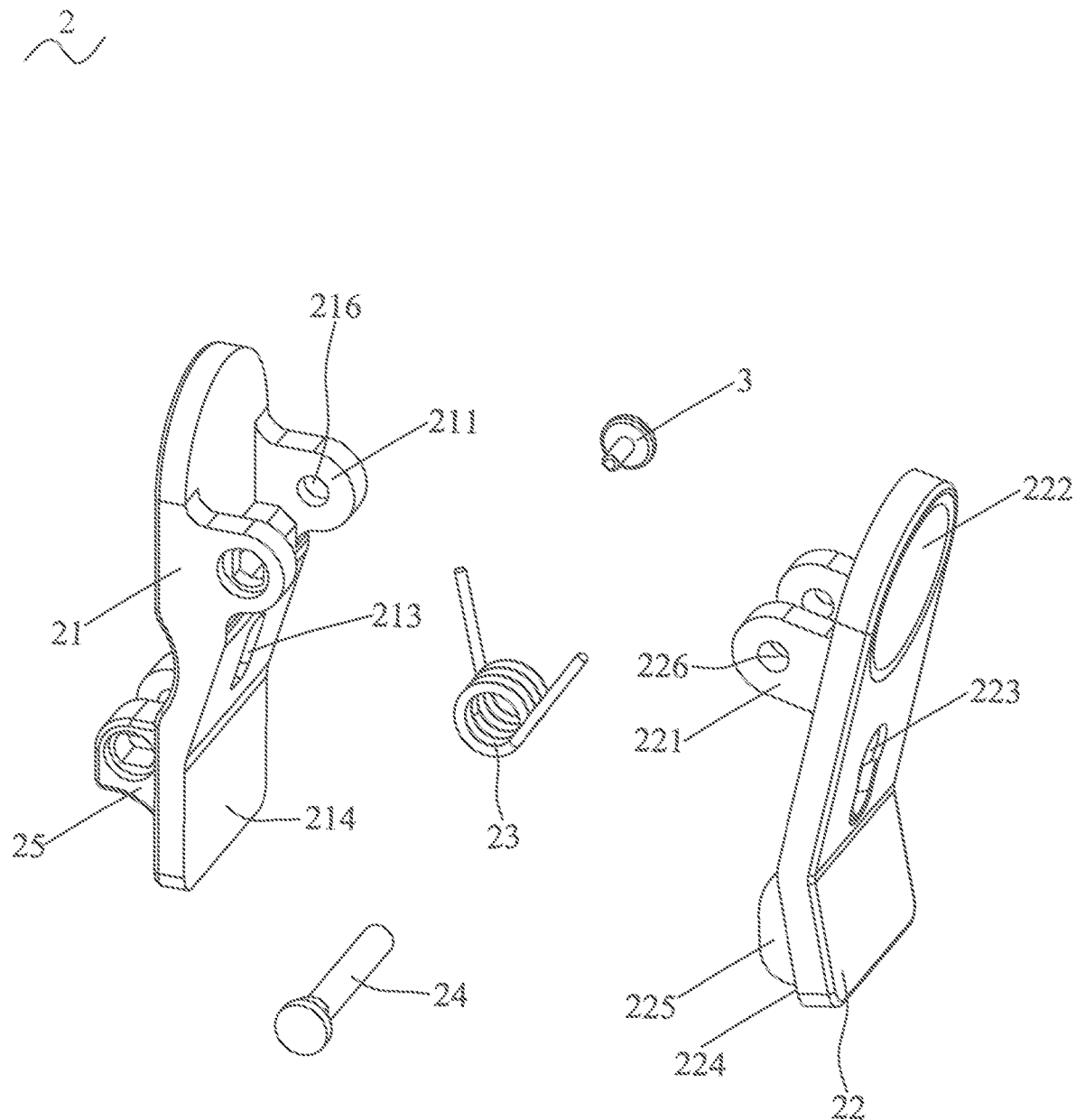
FIG. 7 is an exploded view of a clamping module of the camera device with the clamping module in accordance with the present invention.
Figure 8:
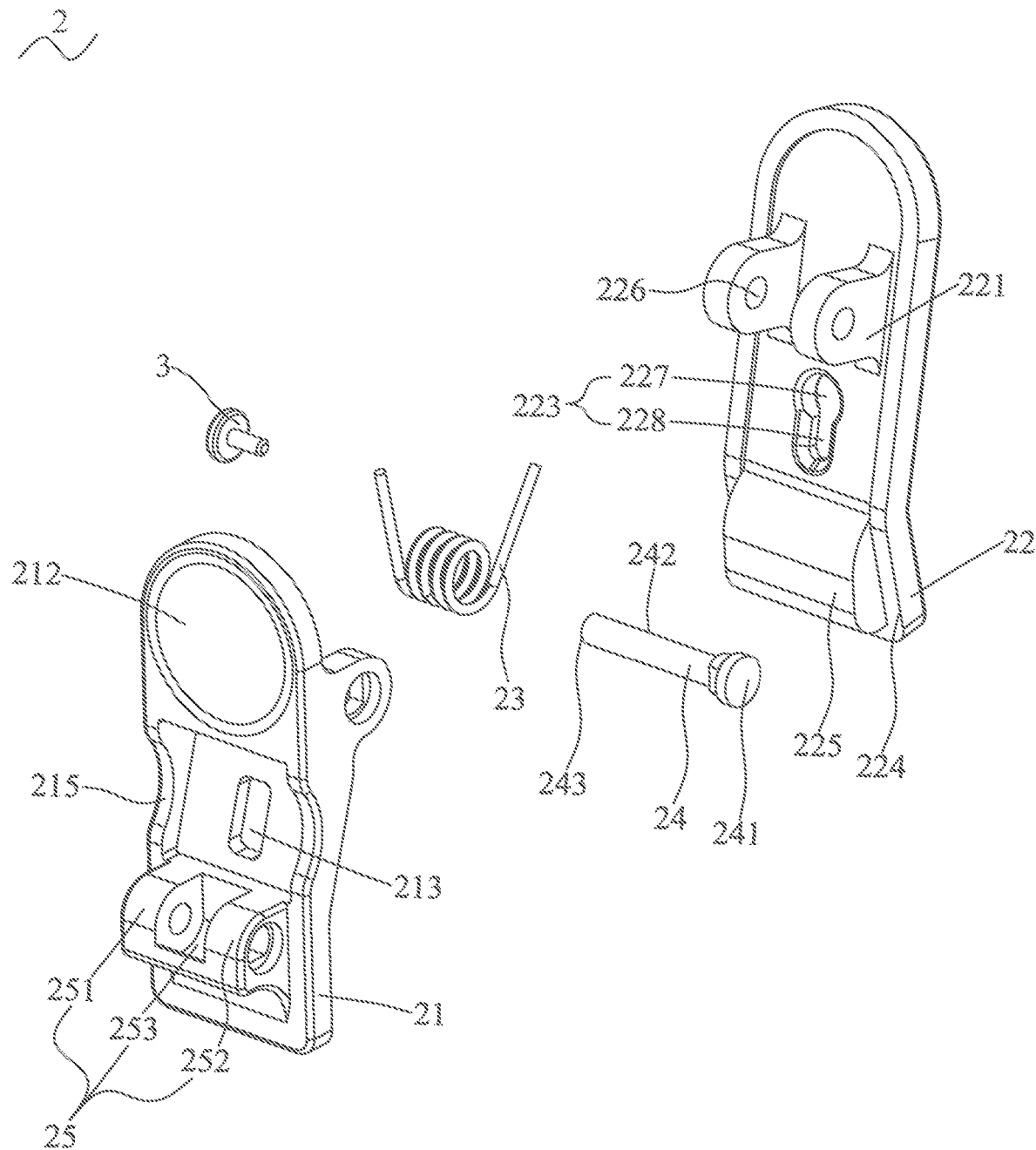
FIG. 8 is another exploded view of the clamping module of the camera device with the clamping module in accordance with the present invention.

With reference to FIG. 1 and FIG. 2, a camera device 101 in accordance with a preferred embodiment of the present invention is shown. Specifically, a camera device with a clamping module 100 in accordance with a preferred embodiment of the present invention is shown. The camera device 101 is the camera device with the clamping module 100. The camera device with the clamping module 100 is adapted for being assembled to a frame 201 of a notebook computer 200. In a concrete implementation, the camera device with the clamping module 100 is also able to be assembled to other types of electronic equipment.

With reference to FIG. 1 to FIG. 5, the camera device with the clamping module 100 includes a camera module 1 which includes a rotation shaft 4, a clamping module 2, two screws 3 and a cable 5. The camera module 1 is disposed to a middle of a front of the clamping module 2. One screw 3 is mounted to one side of the camera module 1 and one side of the clamping module 2. The rotation shaft 4 is mounted to the other side of the camera module 1 and the other side of the clamping module 2. A diameter of one end of the rotation shaft 4 is smaller than a diameter of the other end of the rotation shaft 4. The one end of the rotation shaft 4 is of a hollow shape and faces towards the one screw 3. The rotation shaft 4 and the one screw 3 are locked with each other and in alignment with each other. The one screw 3 is corresponding to and matched with a middle of the one end of the rotation shaft 4. The rotation shaft 4 has a first blocking portion 41, and a first insertion portion 42 protruded transversely from a middle of one side of the first blocking portion 41. A free end of the first insertion portion 42 is opened freely to form a first insertion hole 43. One end of the cable 5 is connected with an inside of the camera module 1. A part of the one end of the cable 5 is disposed to a corresponding portion of the clamping module 2. The other end of the cable 5 is connected to the notebook computer 200. In the preferred embodiment, the one screw 3 and the rotation shaft 4 are assembled into a shaft assembly structure 304.

Referring to FIG. 1 to FIG. 6, the camera module 1 is pivoted to the clamping module 2 to rotate to adjust visual angles of the camera module 1. The camera module 1 includes a front cover 11, an image module 12, a rear cover 13, a transparent piece 14 and a friction ring 15. The image module 12 is disposed in the front cover 11. The image module 12 is used for an image transmission. The rear cover 13 is disposed behind a rear of the image module 12. The transparent piece 14 is mounted to a front surface of the front cover 11. The transparent piece 14 is used for prettifying the camera module 1. The friction ring 15 is disposed in a corresponding portion of the front cover 11. The friction ring 15 is used for cooperating with the rotation shaft 4 to make the camera module 1 rotate to adjust the visual angles.

The front cover 11 has a cylindrical pivoting portion 111, a first through-hole 112 and a fixing hole 113. A bottom surface of the front cover 11 is connected with the pivoting portion 111. The pivoting portion 111 is mounted to a corresponding mechanism of the clamping module 2 to realize a location and a fixation between the camera module 1 and the clamping module 2. An inside of a middle of the pivoting portion 111 is the first through-hole 112. The first through-hole 112 receives the friction ring 15. A middle of the friction ring 15 has a second through-hole 151 transversely penetrating through the friction ring 15. The rotation shaft 4 passes through the second through-hole 151 of the friction ring 15 and the first through-hole 112. The one screw 3 is inserted into the first insertion hole 43 of the one end of the rotation shaft 4.

A front surface of the front cover 11 has the fixing hole 113 longitudinally penetrating through the front cover 11. The transparent piece 14 is fixed in the fixing hole 113. A middle of a bottom surface of the rear cover 13 is recessed upward to form a notch 131. One end of the cable 5 is connected to a rear end of the image module 12, and the one end of the cable 5 extends outward and passes through the notch 131.

Referring to FIG. 1 to FIG. 8, the clamping module 2 includes a first clamping arm 21, a second clamping arm 22 positioned opposite to the first clamping arm 21, an elastic element 23 and a connection shaft 24. The camera module 1 is pivoted to an outer surface of the first clamping arm 21 of the clamping module 2 by the rotation shaft 4 to make the camera module 1 rotate so as to adjust visual angles of the camera module 1. The rotation shaft 4 is pivoted to the first clamping arm 21. The camera module 1 is pivoted to the outer surface of the first clamping arm 21 of the clamping module 2 by virtue of the rotation shaft 4 being pivoted to a lower end of the first clamping arm 21 and a lower end of the camera module 1. The first clamping arm 21 and the second clamping arm 22 are disposed opposite to each other. The elastic element 23 is elastically mounted between the first clamping arm 21 and the second clamping arm 22. The connection shaft 24 passes through corresponding portions of the first clamping arm 21, the second clamping arm 22 and the elastic element 23. The connection shaft 24 is locked to and fastened to the first clamping arm 21, the second clamping arm 22 and the elastic element 23 by the other screw 3 to form the clamping module 2. The connection shaft 24 has a second blocking portion 241, and a second insertion portion 242 protruded transversely from a middle of one side of the second blocking portion 241. A free end of the second insertion portion 242 is opened freely to form a second insertion hole 243. In the preferred embodiment, the elastic element 23 is a torsion spring.

The first clamping arm 21 has a first extending portion 211 extended from an upper end of an inner surface of the first clamping arm 21, a first pressing portion 212 recessed inward in an upper end of the outer surface of the first clamping arm 21, a first fastening hole 213, a first clamping portion 214 formed at a lower end of the inner surface of the first clamping arm 21, and at least two avoiding grooves 215. The first pressing portion 212 is formed at the upper end of the outer surface of the first clamping arm 21. The first clamping arm 21 further has at least two first extending portions 211. At least two portions of two opposite sides of the upper end of the inner surface of the first clamping arm 21 extend towards the second clamping arm 22 to form the at least two first extending portions 211. In the preferred embodiment, two portions of the two opposite sides of the upper end of the inner surface of the first clamping arm 21 extend towards the second clamping arm 22 and perpendicular to the upper end of the inner surface of the first clamping arm 21 to form two first extending portions 211 spaced from each other.

Each first extending portion 211 has a first perforation 216. Specifically, the first extending portion 211 has the first perforation 216. An inner side of the first perforation 216 is shown as an irregular shape and has two arc walls and two segments. An outer side of the first perforation 216 is shown as a circular shape and surrounds the inner side of the first perforation 216. The first perforation 216 and the elastic element 23 have a same axis center. The upper end of the outer surface of the first clamping arm 21 is recessed inward to form the first pressing portion 212. A user exerts a force on the first pressing portion 212 and a corresponding part of the second clamping arm 22 to make the clamping module 2 to opened to an angle so as to bring a convenience for the clamping module 2 to grip the notebook computer 200 or one of other types of the electronic equipment.

A middle of the first clamping arm 21 has the first fastening hole 213 longitudinally penetrating through the first clamping arm 21. The first fastening hole 213 receives a portion of the one end of the cable 5. The lower end of the inner surface of the first clamping arm 21 is flat to form the first clamping portion 214. The first clamping portion 214 is matched with a matching portion of the second clamping arm 22 to make the camera device with the clamping module 100 steadily grip one electronic equipment. Two opposite sides of a middle of the outer surface of the first clamping arm 21 are recessed inward to form two avoiding grooves 215. When each visual angle is to be adjusted, fingers are placed in the two avoiding grooves 215, and holds two sides of the front cover 11 of the camera module 1 to manually adjust the camera device with the clamping module 100. The two avoiding grooves 215 and the first pressing portion 212 of the first clamping arm 21 are located at a same side of the camera device with the clamping module 100.

A lower end of the outer surface of the first clamping arm 21 protrudes outward to form a protruding stage 25. The protruding stage 25, the two avoiding grooves 215 and the first pressing portion 212 of the first clamping arm 21 are located at the same side of the camera device with the clamping module 100. The protruding stage 25 includes a first location portion 251, a second location portion 252 and a receiving groove 253. One side of the protruding stage 25 has the annular first location portion 251 protruding upward and arched outward. An inner side of a middle of the first location portion 251 has a circular first location hole 254. An outer side of the middle of the first location portion 251 and an outer side of the middle of the second location portion 252 have two circular limiting holes 256. The other side of the protruding stage 25 has the annular second location portion 252 protruding upward and arched outward. An inner side of a middle of the second location portion 252 has an irregular second location hole 255. Side walls of the second location hole 255 are the two arc walls and the two segments.

The rotation shaft 4 is mounted to the second location portion 252. The rotation shaft 4 is mounted in one limiting hole 256 and the second location hole 255 of the second location portion 252. The first insertion portion 42 is inserted into the one limiting hole 256 and the second location hole 255 of the second location portion 252. The first blocking portion 41 is limited in the one limiting hole 256. The first location portion 251 is spaced from the second location portion 252 to form the receiving groove 253 between the first location portion 251 and the second location portion 252. The receiving groove 253 receives the pivoting portion 111 of the camera module 1.

The rotation shaft 4 passes through the first location hole 254 and is located to the other limiting hole 256 of the first location portion 251. The first insertion portion 42 is inserted into the first location hole 254 through the first through-hole 112 and the second through-hole 151. The one screw 3 is mounted to the first location portion 251. The outer side of the one screw 3 is mounted in the other limiting hole 256 of the first location portion 251 and an inner side of the one screw 3 is inserted into the first insertion hole 43 of the one end of the rotation shaft 4. The first location portion 251, the second location portion 252 and the second through-hole 151 are concentric. After the rotation shaft 4 passes through the second location portion 252, the first through-hole 112 of the pivoting portion 111, the second through-hole 151 and a section of the first location portion 251, the rotation shaft 4 is locked to and fastened to the second location portion 252, the pivoting portion 111, the second through-hole 151 and the section of the first location portion 251 by the one screw 3 to make the camera module 1 be able to manually adjust the visual angles. The middle of the outer surface of the first clamping arm 21 is recessed inward to form a concave portion 217 which receives a rear portion of the camera module 1. The first fastening hole 213 penetrates through a surface of the concave portion 217 and communicates with the concave portion 217. The concave portion 217 communicates with the first fastening hole 213. The concave portion 217 is formed at the middle of the outer surface of the first clamping arm 21. The rear portion of the camera module 1 is received in the concave portion 217 of the first clamping arm 21.

The second clamping arm 22 has a second extending portion 221 extended from an upper end of an inner surface of the second clamping arm 22, a second pressing portion 222 recessed inward in an upper end of an outer surface of the second clamping arm 22, a second fastening hole 223, a second clamping portion 224 slantwise extended outward and downward from a lower end of the inner surface of the second clamping arm 22, and a soft block 225. The second clamping portion 224 is formed at the lower end of the inner surface of the second clamping arm 22. The elastic element 23 is mounted between the first extending portion 211 and the second extending portion 221. Preferably, two opposite sides of the upper end of the inner surface of the second clamping arm 22 facing the first clamping arm 21 extend towards the first clamping arm 21 to form two second extending portions 221 spaced from each other. Each second extending portion 221 has a second perforation 226 transversely penetrating through each second extending portion 221. The second extending portion 221 has the second perforation 226. The second perforations 226 of the two second extending portions 221, the elastic element 23 and the first perforations 216 of the two first extending portions 211 are concentric. The connection shaft 24 passes through the first perforations 216 of the two first extending portions 211, the elastic element 23 and the second perforations 226 of the two second extending portions 221.

The elastic element 23 is worn around the connection shaft 24 and located between the two second extending portions 221. The connection shaft 24 is connected with the first extending portion 211, the elastic element 23 and the second extending portion 221, the connection shaft 24 passes through a middle of the elastic element 23, and the elastic element 23 is mounted around the connection shaft 24 for making the first clamping arm 21 and the second clamping arm 22 have an elastic gripping force. In the preferred embodiment, the connection shaft 24 is connected with the two first extending portions 211, the elastic element 23 and the two second extending portions 221, the connection shaft 24 passes through the middle of the elastic element 23, and the elastic element 23 is mounted around the connection shaft 24 for making the first clamping arm 21 and the second clamping arm 22 have the elastic gripping force. The two second extending portions 221 together with the elastic element 23 are mounted between the two first extending portions 211. The other screw 3 is inserted into the second insertion hole 243 of the connection shaft 24. An outer end of the other screw 3 and the second blocking portion 241 are received in outer sides of the two first perforations 216 of the two first extending portions 211 and are blocked by peripheral walls of inner sides of the two first perforations 216 of the two first extending portions 211. Two free ends of the elastic element 23 elastically abut against the inner surface of the first clamping arm 21 and the inner surface of the second clamping arm 22. The camera device with the clamping module 100 makes the first clamping arm 21 and the second clamping arm 22 have the gripping force by virtue of an elastic force provided by the elastic element 23.

Several portions of the top end of the inner surface of the second clamping arm 22 facing the first clamping arm 21 extend towards the first clamping arm to form a plurality of second extending portions 221 disposed between the two first extending portions 211. The upper end of the outer surface of the second clamping arm 22 is recessed inward to form the second pressing portion 222. The user exerts the force on the second pressing portion 222 and the first pressing portion 212 to make the clamping module 2 opened to the angle so as to bring the convenience for the clamping module 2 to grip the notebook computer 200 or the one of other types of the electronic equipment.

A middle of the second clamping arm 22 has the second fastening hole 223 longitudinally penetrating through the second clamping arm 22. The second fastening hole 223 receives the portion of the one end of the cable 5. The portion of the one end of the cable 5 is positioned in and passes through the first fastening hole 213 and the second fastening hole 223. The second fastening hole 223 has a circular connecting hole 227, and a clamping hole 228 communicated with the circular connecting hole 227. Before the portion of the cable 5 is clamped in the second fastening hole 223, the portion of the cable 5 is moved to the circular connecting hole 227, and then the clamping module 2 is operated to grip the notebook computer 200 or other types of the electronic equipment. After the portion of the cable 5 is clamped in the second fastening hole 223, the portion of the cable 5 is moved to the clamping hole 228 to be fastened.

The clamping hole 228 is capable of guiding a weight of the cable 5 or a pulling force exerted by an external force to the gripping force generated by the camera device with the clamping module 100 to be supported or absorbed, a rotation angle deviation of the camera module 1 is prevented from being affected on account of a factor of the cable 5. The lower end of the inner surface of the second clamping arm 22 slantwise extends outward and downward to form the second clamping portion 224. The second clamping portion 224 cooperates with the first clamping portion 214 to make the camera device with the clamping module 100 steadily grip the electronic equipment. A middle of the second clamping portion 224 is equipped with the soft block 225. The soft block 225 has a supporting function, an anti-slip function and a buffering function.

Referring to FIG. 1 to FIG. 8 again, the rotation shaft 4 passes through the second location portion 252, the second through-hole 151 and the section of the first location portion 251, and the rotation shaft 4 is locked to and fastened to the second location portion 252, the second through-hole 151 and the section of the first location portion 251 by the screw 3 to make the camera module 1 be able to manually adjust the visual angles. Before the portion of the cable 5 is clamped in the second fastening hole 223, the portion of the cable 5 is moved to the circular connecting hole 227, and then the clamping module 2 is operated to grip the notebook computer 200 or other types of the electronic equipment. The second clamping portion 224 cooperates with the first clamping portion 214 to make the camera device with the clamping module 100 steadily grip the electronic equipment. After the portion of the cable 5 is clamped in the second fastening hole 223, the portion of the cable 5 is moved to the clamping hole 228 to be fastened.

The clamping hole 228 is capable of guiding the weight of the cable 5 or the pulling force exerted by the external force to the gripping force generated by the camera device with the clamping module 100 to be supported or absorbed, the rotation angle deviation of the camera module 1 is prevented from being affected on account of the factor of the cable 5. When each visual angle is to be adjusted, the fingers are placed in the two avoiding grooves 215, and holds the two sides of the front cover 11 of the camera module 1 to manually adjust the camera device with the clamping module 100. Thus the camera device with the clamping module 100 is capable of being steadily fastened to the notebook computer 200 or other types of the electronic equipment and capable of adjusting the visual angles of the camera device with the clamping module 100.

As described above, the camera device with the clamping module 100 makes the first clamping arm 21 and the second clamping arm 22 have the gripping force by virtue of the elastic force provided by the elastic element 23, so that the camera device with the clamping module 100 is able to stably grip the electronic equipment. Furthermore, the friction ring 15 cooperates with the rotation shaft 4 to make the camera module 1 rotate visual angles to adjust the visual angles. Thus, the camera device with the clamping module 100 is capable of being positioned more stably, and the visual angles of the camera device with the clamping module 100 are adjustable.

What is claimed is:

1. A camera device with a clamping module, comprising:
   a clamping module, including:
   a first clamping arm having a first extending portion extended from an upper end of an inner surface of the first clamping arm, a first pressing portion recessed inward in an upper end of an outer surface of the first clamping arm, and a first clamping portion formed at a lower end of the inner surface of the first clamping arm;
   a second clamping arm positioned opposite to the first clamping arm, the second clamping arm having a second extending portion extended from an upper end of an inner surface of the second clamping arm, a second pressing portion recessed inward in an upper end of an outer surface of the second clamping arm, and a second clamping portion slantwise extended outward and downward from a lower end of the inner surface of the second clamping arm;
   an elastic element mounted between the first extending portion and the second extending portion; and
   a connection shaft connected with the first extending portion, the elastic element and the second extending portion, the connection shaft passing through a middle of the elastic element, and the elastic element being mounted around the connection shaft for making the first clamping arm and the second clamping arm have an elastic gripping force; and
   a camera module including a rotation shaft, the camera module being pivoted to the outer surface of the first clamping arm of the clamping module by the rotation shaft.

2. The camera device with the clamping module as claimed in claim 1, wherein the first extending portion has a first perforation, the second extending portion has a second perforation, the second perforation, the elastic element and the first perforation have a same axis center, the connection shaft passes through the first perforation, the elastic element and the second perforation.

3. The camera device with the clamping module as claimed in claim 1, wherein the elastic element is a torsion spring.

4. The camera device with the clamping module as claimed in claim 1, wherein the camera module includes a front cover, an image module, a rear cover and a transparent piece, the image module is disposed in the front cover, the rear cover is disposed behind a rear of the image module, the transparent piece is mounted to a front surface of the front cover.

5. The camera device with the clamping module as claimed in claim 4, wherein the camera module further includes a friction ring, a bottom surface of the front cover is connected with a pivoting portion, an inside of a middle of the pivoting portion is a first through-hole, the first through-hole receives the friction ring, the front surface of the front cover has a fixing hole longitudinally penetrating through the front cover, the transparent piece is fixed in the fixing hole, a middle of the friction ring has a second through-hole longitudinally penetrating through the friction ring, the rotation shaft passes through the second through-hole and the first through-hole.

6. The camera device with the clamping module as claimed in claim 5, further comprising a cable, a middle of a bottom surface of the rear cover being recessed upward to form a notch, one end of the cable extending outward and passing through the notch, a middle of the first clamping arm having a first fastening hole longitudinally penetrating through the first clamping arm, a middle of the second clamping arm having a second fastening hole longitudinally penetrating through the second clamping arm, a portion of the one end of the cable being positioned in and passing through the first fastening hole and the second fastening hole.

7. The camera device with the clamping module as claimed in claim 6, further comprising one screw, the one screw and the rotation shaft being assembled into a shaft assembly structure.

8. The camera device with the clamping module as claimed in claim 7, wherein a lower end of the outer surface of the first clamping arm protrudes outward to form a protruding stage, one side of the protruding stage has an annular first location portion protruding upward and arched outward, an inner side of a middle of the first location portion has a circular first location hole, the other side of the protruding stage has an annular second location portion protruding upward and arched outward, an inner side of a middle of the second location portion has an irregular second location hole, an outer side of the middle of the first location portion and an outer side of the middle of the second location portion have two circular limiting holes, the rotation shaft is mounted to the second location portion, the one screw is mounted to the first location portion, and the first location portion, the second location portion and the second through-hole are concentric, after the rotation shaft passes through the second location portion, the first through-hole of the pivoting portion, the second through-hole and a section of the first location portion, the rotation shaft is locked to and fastened to the second location portion, the pivoting portion, the second through-hole and the section of the first location portion by the one screw.

9. The camera device with the clamping module as claimed in claim 8, wherein the first location portion is spaced from the second location portion to form a receiving groove between the first location portion and the second location portion, the receiving groove receives the pivoting portion of the camera module.

10. The camera device with the clamping module as claimed in claim 8, wherein two opposite sides of a middle of the outer surface of the first clamping arm are recessed inward to form two avoiding grooves, the protruding stage, the two avoiding grooves and the first pressing portion of the first clamping arm are located at a same side of the camera device with the clamping module.

11. The camera device with the clamping module as claimed in claim 8, wherein the rotation shaft has a first blocking portion, and a first insertion portion protruded transversely from a middle of one side of the first blocking portion, a free end of the first insertion portion is opened freely to form a first insertion hole, the first insertion portion is inserted into one limiting hole and the second location hole of the second location portion, the first blocking portion is limited in the one limiting hole, the first insertion portion is inserted into the first location hole, an outer side of the one screw is mounted in the other limiting hole of the first location portion and an inner side of the one screw is inserted into the first insertion hole.

12. The camera device with the clamping module as claimed in claim 11, wherein two portions of two opposite sides of the upper end of the inner surface of the first clamping arm extend towards the second clamping arm and perpendicular to the upper end of the inner surface of the first clamping arm to form two first extending portions, each first extending portion has a first perforation, two opposite sides of the upper end of the inner surface of the second clamping arm facing the first clamping arm extend towards the first clamping arm to form two second extending portions spaced from each other, each second extending portion has a second perforation transversely penetrating through each second extending portion, the elastic element is worn around the connection shaft and located between the two second extending portions, the connection shaft is connected with the two first extending portions, the elastic element and the two second extending portions, the two second extending portions together with the elastic element are mounted between the two first extending portions.

13. The camera device with the clamping module as claimed in claim 12, wherein the second perforations of the two second extending portions, the elastic element and the first perforations of the two first extending portions are concentric.

14. The camera device with the clamping module as claimed in claim 12, wherein the connection shaft passes through the first perforations of the two first extending portions, the elastic element and the second perforations of the two second extending portions, the connection shaft has a second blocking portion, and a second insertion portion protruded transversely from a middle of one side of the second blocking portion, a free end of the second insertion portion is opened freely to form a second insertion hole, the other screw is inserted into the second insertion hole of the connection shaft, an outer end of the other screw and the second blocking portion are received in outer sides of the two first perforations of the two first extending portions and are blocked by peripheral walls of inner sides of the two first perforations of the two first extending portions, two free ends of the elastic element elastically abut against the inner surface of the first clamping arm and the inner surface of the second clamping arm.

15. A camera device with a clamping module, comprising:
a clamping module, including:
a first clamping arm having a first pressing portion recessed inward in an upper end of an outer surface of the first clamping arm, and a first clamping portion formed at a lower end of an inner surface of the first clamping arm, two portions of two opposite sides of an upper end of the inner surface of the first clamping arm extending perpendicular to the upper end of the inner surface of the first clamping arm to form two first extending portions;
a second clamping arm positioned opposite to the first clamping arm, the second clamping arm having a second pressing portion recessed inward in an upper end of an outer surface of the second clamping arm, and a second clamping portion slantwise extended outward and downward from a lower end of an inner surface of the second clamping arm, two opposite sides of an upper end of the inner surface of the second clamping arm extending towards the first clamping arm to form two second extending portions;
an elastic element located between the two second extending portions, the two second extending portions together with the elastic element being mounted between the two first extending portions; and
a connection shaft connected with the two first extending portions, the elastic element and the two second extending portions, the connection shaft passing through a middle of the elastic element, and the elastic element being mounted around the connection shaft for making the first clamping arm and the second clamping arm have an elastic gripping force; and
a camera module including a rotation shaft, the camera module being pivoted to the outer surface of the first clamping arm of the clamping module by virtue of the rotation shaft being pivoted to a lower end of the first clamping arm and a lower end of the camera module.

16. A camera device, comprising:
a clamping module including:
a first clamping arm having:
a first extending portion extended from an upper end of an inner surface of the first clamping arm;
a first clamping portion formed at a lower end of the inner surface of the first clamping arm;
a first pressing portion formed at an upper end of an outer surface of the first clamping arm; and
a concave portion formed at a middle of the outer surface of the first clamping arm;
a second clamping arm positioned opposite to the first clamping arm, the second clamping arm having:

a second extending portion extended from an upper end of an inner surface of the second clamping arm;

a second clamping portion formed at a lower end of the inner surface of the second clamping arm; and a second pressing portion formed at an upper end of an outer surface of the second clamping arm;

an elastic element located between the first extending portion and the second extending portion; and a connection shaft connected with the first extending portion, the elastic element and the second extending portion; and a camera module having a rotation shaft which is pivoted to the first clamping arm, a rear portion of the camera module being received in the concave portion of the first clamping arm;

wherein the first clamping arm has a first fastening hole longitudinally penetrating through the first clamping arm, the second clamping arm has a second fastening hole longitudinally penetrating through the second clamping arm, the camera device includes a cable passing through the first fastening hole and the second fastening hole.

17. The camera device as claimed in claim 16, wherein the first fastening hole penetrates through a surface of the concave portion and communicates with the concave portion.

18. The camera device as claimed in claim 16, wherein the second fastening hole has a circular connecting hole, and a clamping hole communicated with the circular connecting hole.

19. The camera device as claimed in claim 16, wherein a lower end of the outer surface of the first clamping arm protrudes outward to form a protruding stage, one side of the protruding stage has an annular first location portion protruding upward and arched outward, an inner side of a middle of the first location portion has a circular first location hole, the other side of the protruding stage has an annular second location portion protruding upward and arched outward, an inner side of a middle of the second location portion has an irregular second location hole, an outer side of the middle of the first location portion and an outer side of the middle of the second location portion have two circular limiting holes, the camera module includes a front cover and a friction ring, a bottom surface of the front cover is connected with a pivoting portion, an inside of a middle of the pivoting portion is a first through-hole, the first through-hole receives the friction ring, a middle of the friction ring has a second through-hole longitudinally penetrating through the friction ring, the rotation shaft is mounted to the second location portion, one screw is mounted to the first location portion, after the rotation shaft passes through the second location portion, the first through-hole of the pivoting portion, the second through-hole and a section of the first location portion, the rotation shaft is locked to and fastened to the second location portion, the pivoting portion, the second through-hole and the section of the first location portion by the one screw, the first location portion, the second location portion and the second through-hole are concentric.

\* \* \* \* \*